United States Patent
Sadafale et al.

(10) Patent No.: US 9,378,185 B2
(45) Date of Patent: Jun. 28, 2016

(54) TRANSFORM AND QUANTIZATION ARCHITECTURE FOR VIDEO CODING AND DECODING

(75) Inventors: Mangesh Sadafale, Nagpur (IN); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1073 days.

(21) Appl. No.: 13/250,822

(22) Filed: Sep. 30, 2011

(65) Prior Publication Data

US 2012/0082212 A1 Apr. 5, 2012

Related U.S. Application Data

(60) Provisional application No. 61/388,509, filed on Sep. 30, 2010.

(51) Int. Cl.
| | |
|---|---|
| *G06F 17/14* | (2006.01) |
| *H04N 19/122* | (2014.01) |
| *H04N 19/61* | (2014.01) |
| *H04N 19/156* | (2014.01) |
| *H04N 19/42* | (2014.01) |

(52) U.S. Cl.
CPC ............ *G06F 17/147* (2013.01); *H04N 19/122* (2014.11); *H04N 19/156* (2014.11); *H04N 19/42* (2014.11); *H04N 19/61* (2014.11)

(58) Field of Classification Search
CPC ....... H04N 7/26244; H04N 7/30; H04N 7/50; H04N 7/26085; H04N 7/26106; H04N 19/00812; H04N 19/00775; H04N 19/00563; H04N 19/00296; H04N 7/26101; G06F 17/147; G06F 12/0207; G06F 17/16; G06T 3/40

USPC .......................................... 375/240.01–240.27
See application file for complete search history.

(56) References Cited

U.S. PATENT DOCUMENTS

| | | | | |
|---|---|---|---|---|
| 7,574,468 | B1* | 8/2009 | Rayala ........................... | 708/402 |
| 2005/0050128 | A1* | 3/2005 | Ju .................................. | 708/402 |
| 2006/0029131 | A1* | 2/2006 | Song et al. ............... | 375/240.03 |
| 2007/0192394 | A1* | 8/2007 | Wang et al. .................. | 708/404 |
| 2008/0240250 | A1* | 10/2008 | Lin et al. ................... | 375/240.18 |
| 2008/0310512 | A1* | 12/2008 | Ye et al. .................... | 375/240.16 |
| 2011/0153699 | A1 | 6/2011 | Reznik et al. | |

OTHER PUBLICATIONS

Mangesh Sadafale and Madhukar Budagavi, "Matrix Multiplication Specification for HEVC Transforms" JCTVC-D036, Jan. 20-28, 2011, pp. 1-6, Joint Collaborative Team on Video Coding (JCT-VC) of ITU-T SG16 WP3 and ISO/IEC JTC1/SC29/WG11, Daegu, South Korea.

(Continued)

*Primary Examiner* — Andy Rao
*Assistant Examiner* — Jared Walker
(74) *Attorney, Agent, or Firm* — Charles A. Brill; Frank D. Cimino

(57) ABSTRACT

A method of encoding a video stream in a video encoder is provided that includes computing an offset into a transform matrix based on a transform block size, wherein a size of the transform matrix is larger than the transform block size, and wherein the transform matrix is one selected from a group consisting of a DCT transform matrix and an IDCT transform matrix, and transforming a residual block to generate a DCT coefficient block, wherein the offset is used to select elements of rows and columns of a DCT submatrix of the transform block size from the transform matrix.

18 Claims, 7 Drawing Sheets

(56) References Cited

OTHER PUBLICATIONS

A. Fuldseth et al, "Transform Design for HEVC with 16 Bit Intermediate Data Representation", JCTVC-E243, Mar. 16-23, 2011, pp. 1-16, Joint Collaborative Team on Video Coding (JCT-VC) of ITU-T SG16 WP3 and ISO/IEC JTC1/SC29/WG11, Geneva, Switzerland.

A. Fuldseth et al, "CE10: Core Transform Design for HEVC", JCTVC-F446, Jul. 14-22, 2011, pp. 1-13, Joint Collaborative Team on Video Coding (JCT-VC) of ITU-T SG16 WP3 and ISO/IEC JTC1/SC29/WG11, Torino, Italy.

Thomas Wiegand et al, "WD1: Working Draft 1 of High-Efficiency Video Coding", JCTVC-C403, Oct. 7-15, 2010, pp. 1-137, Joint Collaborative Team on Video Coding (JCT-VC) of ITU-T SG16 WP3 and ISO/IEC JTC1/SC29/WG11, Guangzhou, China.

Mangesh Sadafale and Madhukar Budagavi, "Low-Complexity, Configurable Transform Architecture for HEVC", JCTVC-C226, Oct. 7-15, 2010, pp. 1-4, Joint Collaborative Team on Video Coding (JCT-VC) of ITU-T SG16 WP3 and ISO/IEC JTC1/SC29/WG11, Guangzhou, China.

Iain Richardson, "White Paper: 4×4 Transform and Quantization in H.264/AVC", VCodex Limited, Version 1.2, Revised Nov. 2010, pp. 1-13.

Ching-Yu Hung and Paul Landman, "Compact Inverse Discrete Cosine Transform Circuit for MPEG Video Decoding", IEEE Workshop on Signal Processing Systems, 1997, SIPS 97—Design and Implementation, Issue Date Nov. 3-5, 1997, Current Version Aug. 6, 2002, pp. 364-373.

* cited by examiner $$\text{8X8 IDCT MATRIX} \begin{bmatrix} D4 & D1 & D2 & D3 & D4 & D5 & D6 & D7 \\ D4 & D3 & D6 & -D7 & -D4 & -D1 & -D2 & -D5 \\ D4 & D5 & -D6 & -D1 & -D4 & D7 & D2 & D3 \\ D4 & D7 & -D2 & -D5 & D4 & D3 & -D6 & -D1 \\ D4 & -D7 & -D2 & D5 & D4 & -D3 & -D6 & D1 \\ D4 & -D5 & -D6 & D1 & -D4 & -D7 & D2 & -D3 \\ D4 & -D3 & D6 & D7 & -D4 & D1 & -D2 & D5 \\ D4 & -D1 & D2 & -D3 & D4 & -D5 & D6 & -D7 \end{bmatrix}$$

INVERSE

EVEN $\begin{bmatrix} Z0 \\ Z1 \\ Z2 \\ Z3 \end{bmatrix} = \begin{bmatrix} D4 & D2 & D4 & D6 \\ D4 & D6 & -D4 & -D2 \\ D4 & -D6 & -D4 & D2 \\ D4 & -D2 & D4 & -D6 \end{bmatrix} \begin{bmatrix} X0 \\ X2 \\ X4 \\ X6 \end{bmatrix}$ ODD $\begin{bmatrix} Z5 \\ Z6 \\ Z7 \\ Z8 \end{bmatrix} = \begin{bmatrix} -D7 & D5 & -D3 & D1 \\ -D5 & D1 & -D7 & -D3 \\ -D3 & D7 & D1 & D5 \\ -D1 & -D3 & -D5 & -D7 \end{bmatrix} \begin{bmatrix} X1 \\ X3 \\ X5 \\ X7 \end{bmatrix}$ $\begin{bmatrix} Y0 \\ Y1 \\ Y2 \\ Y3 \\ Y4 \\ Y5 \\ Y6 \\ Y7 \end{bmatrix} = \begin{bmatrix} Z0-Z7 \\ Z1-Z6 \\ Z2-Z5 \\ Z3-Z4 \\ Z3+Z4 \\ Z2+Z5 \\ Z1+Z6 \\ Z0+Z7 \end{bmatrix}$

FORWARD $\begin{bmatrix} Z0 \\ Z1 \\ Z2 \\ Z3 \\ Z4 \\ Z5 \\ Z6 \\ Z7 \end{bmatrix} = \begin{bmatrix} X0+X7 \\ X1+X6 \\ X2+X5 \\ X3+X4 \\ -X3+X4 \\ -X2+X5 \\ -X1+X6 \\ -X0+X7 \end{bmatrix}$ $\begin{bmatrix} Y0 \\ Y2 \\ Y4 \\ Y6 \end{bmatrix} = \begin{bmatrix} D4 & D4 & D4 & D4 \\ D2 & D6 & -D6 & -D2 \\ D4 & -D4 & -D4 & D4 \\ D6 & -D2 & D2 & -D6 \end{bmatrix} \begin{bmatrix} Z0 \\ Z1 \\ Z2 \\ Z3 \end{bmatrix}$ EVEN $\begin{bmatrix} Y1 \\ Y3 \\ Y5 \\ Y7 \end{bmatrix} = \begin{bmatrix} -D7 & -D5 & -D3 & -D1 \\ D5 & D1 & D7 & -D3 \\ -D3 & -D7 & D1 & -D5 \\ D1 & -D3 & D5 & -D7 \end{bmatrix} \begin{bmatrix} Z4 \\ Z5 \\ Z6 \\ Z7 \end{bmatrix}$ ODD

*FIG. 2B*

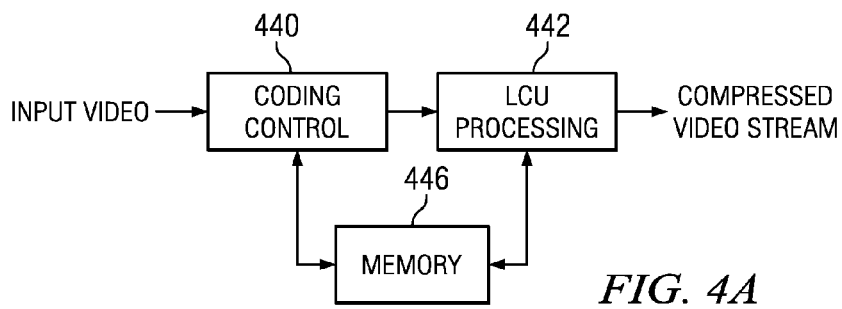

TRANSFORM AND QUANTIZATION ARCHITECTURE FOR VIDEO CODING AND DECODING

CROSS-REFERENCE TO RELATED APPLICATIONS

This application claims benefit of U.S. Provisional Patent Application Ser. No. 61/388,509, filed Sep. 30, 2010, which is incorporated herein by reference in its entirety.

BACKGROUND OF THE INVENTION

1. Field of the Invention

Embodiments of the present invention generally relate to a transformation and quantization architecture for video coding and decoding.

2. Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence.

In the emerging next generation video coding standard currently under development by a Joint Collaborative Team on Video Coding (JCT-VC) established by the ISO/IEC Moving Picture Experts Group (MPEG) and ITU-T Video Coding Experts Group (VCEG) that is commonly referred to High Efficiency Video Coding (HEVC), discrete cosine transforms (DCT) are proposed with the following blocks sizes: 4×4, 8×8, 16×16, 32×32 and 64×64. In addition, directional transforms are proposed that will require full matrix multiplication. While large block size transforms such as 16×16, 32×32 and 64×64 DCTs and directional transforms improve coding efficiency, using such transforms increases implementation complexity significantly. Accordingly, improvements in implementation complexity of large block transforms and directional transforms are needed to ensure the feasibility of HEVC implementations.

Further, hardware codecs are expected to play an important role in deployment of HEVC solutions since HEVC is explicitly designed for use on video sequences with high definition and above video resolution. Hardware acceleration for video compression is already standard in desktop, mobile, and portable devices. In software, HEVC codecs are expected to run on processors that support extensive SIMD (single instruction multiple data) operations. Already, 8-way SIMD architectures are becoming commonplace. Hence, transform architectures that are efficient to implement in both hardware and in software on SIMD machines are also needed.

SUMMARY

Embodiments of the present invention relate to a transform and quantization architecture for video coding and decoding. In one aspect, a method of encoding a video stream in a video encoder includes computing an offset into a transform matrix based on a transform block size, wherein a size of the transform matrix is larger than the transform block size, and wherein the transform matrix is one selected from a group consisting of a DCT transform matrix and an IDCT transform matrix, and transforming a residual block to generate a DCT coefficient block, wherein the offset is used to select elements of rows and columns of a DCT submatrix of the transform block size from the transform matrix.

In one aspect, a method of decoding an encoded bitstream in a video decoder includes computing an offset into a transform matrix based on a transform block size, wherein a size of the transform matrix is larger than the transform block size, and wherein the transform matrix is one selected from a group consisting of a DCT transform matrix and an IDCT transform matrix, and transforming a DCT coefficient block to reconstruct a residual block, wherein the offset is used to select elements of rows and columns of an IDCT submatrix of the transform block size from the transform matrix.

BRIEF DESCRIPTION OF THE DRAWINGS

Particular embodiments will now be described, by way of example only, and with reference to the accompanying drawings:

FIG. 2B shows an example of partial butterfly decomposition;

FIGS. 4A and 4B show block diagrams of a video encoder;

DETAILED DESCRIPTION OF EMBODIMENTS OF THE INVENTION

Figure 1A:
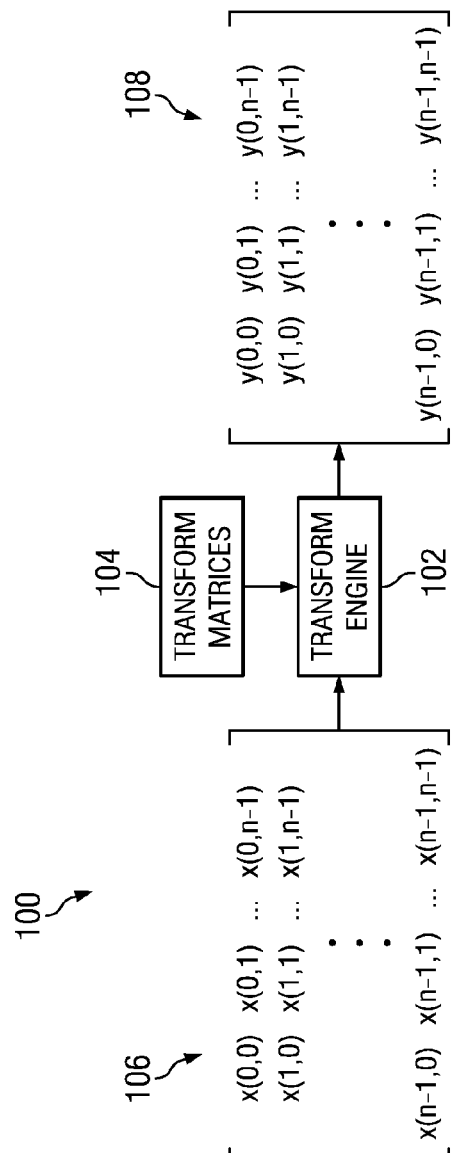
FIGS. 1A, 1B, and 2A show block diagrams of transform architectures.

Specific embodiments of the invention will now be described in detail with reference to the accompanying figures. Like elements in the various figures are denoted by like reference numerals for consistency.

Embodiments of the invention are described herein in reference to the October 2010 draft specification for HEVC entitled "WD1: Working Draft 1 of High-Efficiency Video Coding." One of ordinary skill in the art will understand that embodiments of the invention are not limited to this draft specification or to HEVC.

Some aspects of this disclosure have been presented to the JCT-VC in the following documents: JCTVC-D036, entitled "Matrix Multiplication Specification for HEVC Transforms", Jan. 20-28, 2011, and JCTVC-C226, entitled "Low-Complexity, Configurable Transform Architecture for HEVC", Oct. 7-15, 2010. Both documents are incorporated by reference herein in their entirety.

As used herein, the term "picture" refers to a frame or a field of a frame. A frame is a complete image captured during a known time interval. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, 128×128, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, 32×32 and 64×64. The sizes of the transforms units and prediction units for a CU are determined by the video encoder during prediction based on minimization of rate/distortion costs.

As is well known in the art, a discrete cosine transform (DCT) matrix may be a pure DCT matrix or a matrix derived from the pure DCT matrix by changing of one or more values while maintaining the symmetry property of the DCT. That is, a DCT may be approximated by starting with a matrix of fixed point values corresponding to the general DCT equations, i.e., the pure DCT matrix, and then altering one or more values in the matrix based on empirical evaluations. The term DCT matrix encompasses both types of matrices. The changing of some values in a pure DCT matrix is a common practice in video coding standards for some DCT transforms. An inverse DCT (IDCT) matrix is the transpose of the DCT matrix.

Embodiments of the invention provide a transform architecture for implementation of DCT and inverse DCT (IDCT) that is configurable and can be re-used across various DCT block sizes. The transform architecture is based on matrix multiplication which requires minimal dependency and control logic and is thus suitable for parallel processing. A hardware implementation of the transform architecture needs minimal chip area, and the architecture can be efficiently implemented in software on SIMD processors.

The transform architecture is also a unifying architecture in the sense that the architecture is sufficiently flexible to support other transforms such as directional transforms and 1D transforms. In addition, the transform architecture provides for fixed-point behavior that allows a reduction in the size and number of norm correction matrices (referred to as quantization matrices in H.264/AVC) that would otherwise be required for quantization and inverse quantization. More specifically, one or more of the norm correction matrices typically used may be reduced to small scalar vectors. In one embodiment, a norm correction matrix for quantization or inverse quantization may be reduced to a 6 element scalar vector. For example, the memory requirements for storing certain norm correction matrices for inverse quantization in the HEVC test model under consideration, version 0.7.3 (TMuC-0.7.3) decoder are reduced from 7.5 KB to 12 bytes. There is a similar memory savings in the TMuC-0.7.3 encoder. A fixed-point version of the transform architecture along with reduced size norm correction matrices was implemented in TMuC-0.7.3. Simulation results showed that there was no significant loss in coding efficiency (average 0 to −0.1%) when as compared to the previous transform implementation in TMuC-0.7.3.

Figure 1B:
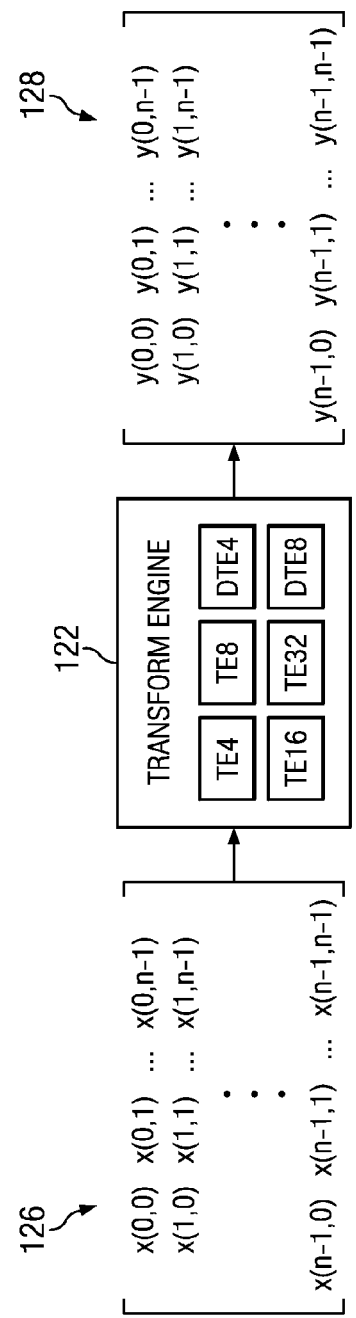

FIGS. 1A and 1B show examples of typical transform architectures for a video encoder and/or video decoder. Referring first to FIG. 1A, the transform architecture 100 includes a transform engine 102 with a matrix multiplication engine and some number of transform matrices 104. In general, there is a separate transform matrix for each transform block size and transform type supported by the video encoder or decoder. To perform a transform or inverse transform on the n×n input block 106, the transform engine 102 performs two full matrix multiplications using the appropriate n×n transform matrix included in the transform matrices 104 to generate an n×n output block 108. For example, for a DCT, the transform engine 102 may compute $DXD^T$ where D is the n×n DCT matrix, $D^T$ is the transpose of that matrix, and X is the input block 106. And, for an IDCT, the transform engine 102 may compute $D^TXD$.

The transform architecture of FIG. 1B includes a transform engine 122 with separate transformation engines for each transform size/type pair supported by the video encoder or decoder and some number of transform matrices 124. This architecture is similar to that proposed in the initial HEVC draft standard and implemented in TMuC-0.7.3. In general, there is at least one separate transform engine for each transform block size/transform type supported by the video encoder or decoder. Thus, for the 4×4, 8×8, 16×16, 32×32 and 64×64 DCTs proposed in HEVC, five engines for these respective sizes would be included. If directional transforms are also supported, an engine for each directional transform size, e.g., 4×4 and 8×8, would also be included.

Each of the transformation engines, e.g., TE4, TE8, etc., implements a transform or inverse transform of one type and size. For example, the TE16 transformation engine implements a 16×16 DCT (or IDCT in a decoder). The TE32 transformation engine implements a 32×32 DCT (or IDCT in a decoder). And, the DTE4 transformation engine implements a 4×4 directional transform (or inverse directional transform in a decoder). Further, each of the transformation engines implements an algorithm specifically designed for the transform size/type performed by that transformation engine.

Figure 2A:
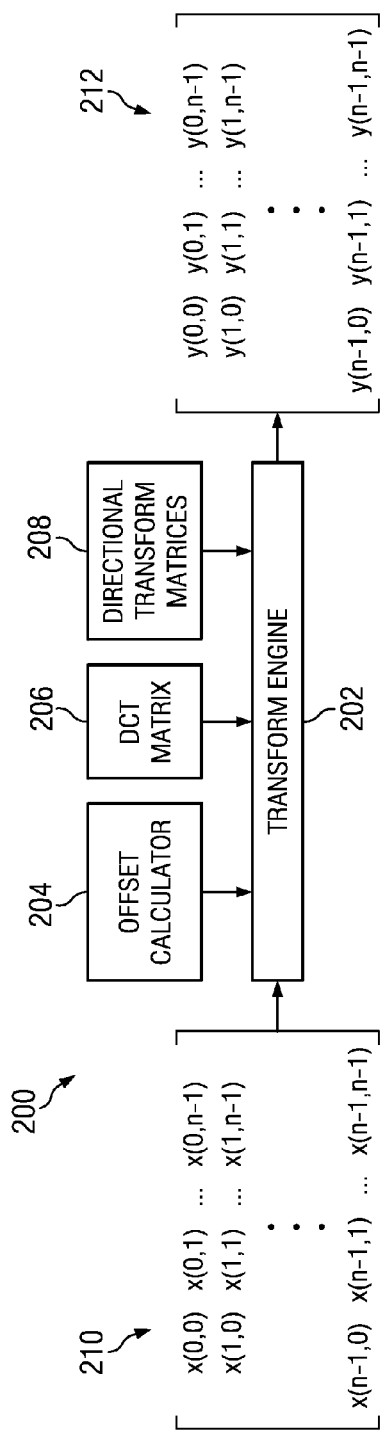

FIG. 2A shows a transform architecture for a video encoder and/or video decoder that uses a unified architecture for implementing transforms Further, the architecture uses a single DCT transform matrix for all DCT block sizes. The transform architecture 200 includes a transform engine 102, an offset calculator 204, and the single DCT matrix 206 stored in memory. If the video encoder and/or decoder also support directional transforms, the transform architecture 200 includes up to two directional transform matrices 208 for each transform size.

The DCT matrix 206 is the size of the largest DCT transform supported by the video encoder, e.g., 64×64. The elements of the DCT matrix 206 are fixed point values defined by the video encoding standard supported. The inventors observed that because of the symmetry in the values of the elements of the DCT matrices for the different DCT sizes, a larger DCT matrix includes the values of the next smaller DCT matrix which includes the values of the next smaller DCT matrix, etc. That is, a 64×64 DCT matrix includes the values of a 32×32 DCT matrix which includes the values of a 16×16 DCT matrix, etc. Thus, if the DCT matrix 206 is 64×64, it includes the values of the elements of the smaller transform sizes, e.g., 32×32, 16×16, 8×8, and 4×4. In effect, the DCT matrices for the smaller transform sizes are submatrices of the DCT matrix 206. Further, the inventors observed that it was possible to pick out the particular elements for a smaller DCT submatrix from a larger DCT matrix using an offset. The elements in the DCT matrix 206 may be signed fixed point values approximating corresponding "pure DCT" values of the general DCT equations and/or signed fixed point values derived by altering the corresponding "pure DCT" values based on empirical evaluations. These fixed point values may be any suitable size, e.g., 8-bits or 7-bits.

The offset calculator 204 determines an offset into the DCT matrix 206 based on the size of the n×n input block 210 and the size of the DCT matrix 206. For example, if n=8 and the DCT matrix 206 is a 64×64 matrix, the offset is computed as 64/8=8. To perform a DCT or IDCT on the n×n input block 210, the transform engine 202 uses a matrix multiplication engine to perform two matrix multiplications using the DCT matrix 206 and the offset determined by the offset calculator 204 to generate the n×n output matrix 212. For each matrix multiplication, the offset is used to pick out the appropriate elements of an n×n submatrix of the DCT matrix 206 for the n×n DCT or IDCT. In some embodiments, for a DCT, the transform engine 102 computes $DXD^T$ where D is the n×n DCT matrix, $D^T$ is the transpose of that matrix, and X is the input block 106. And, for an IDCT, the transform engine 102 computes $D^T X D$. In some embodiments, for a DCT, the transform engine 102 computes $X D D^T$, and, for an IDCT, the transform engine 102 computes $X D^T D$.

In some embodiments, the transform engine 202 includes functionality to perform a partial butterfly decomposition, i.e., to decompose the full matrix multiplication for an nxn DCT or IDCT into smaller matrix multiplications. More specifically, the nxn DCT (IDCT) submatrix and the nxn input block 106 are both decomposed using even/odd decomposition. An even-odd decomposition decomposes a matrix into two matrices, one containing the even rows of the original matrix and one containing the odd rows of the original matrix. Thus, the even-odd decomposition of the nxn DCT (IDCT) submatrix and the nxn input block 106 results in four smaller matrices, each of which is half the size of the original matrix. The four resulting smaller matrices are appropriately multiplied using the matrix multiplication engine to generate the nxn output block 212. The offset is used to extract the elements of the nxn DCT (IDCT) submatrix from the DCT matrix 206. The result is mathematically equivalent to performing the full matrix multiplication. FIG. 2B shows an example of the partial butterfly decomposition for an 8x8 DCT and IDCT. The matrices containing the even rows may also be further decomposed into smaller matrices.

The pseudo code of Table 1 shows an example of using an offset to extract elements of a DCT submatrix from the DCT matrix for an DCT assuming that the DCT is computed as $D^T X D$. In this pseudo code, uiSize is the DCT block size, i.e., n, MAX_TSIZE is the maximum DCT block size, i.e., the size of the DCT matrix 206, uiDCTOffset is the offset into the DCT matrix 206 computed by the offset calculator 204, i.e., MAX_TSIZE/uiSize, pSrc is the input transform coefficient block, i.e., the input block 210, and pDst is the output residual block, i.e., the output block 212. The input data pSrc is a vector of length nxn in which the elements of the nxn block are arranged in row order.

TABLE 1

```
// D'*Input
for(i=0;i<uiSize;i++) {
    for(j=0;j<uiSize;j++) {
        sum = 0;
        for(k=0;k<uiSize;k++)
            sum += DCTMatrix[k*uiDctOffset][i] * pSrc[k][j];
        TransposeBuffer[i][j] = sum; }}
// (D'*Input)*D
for(i=0;i<uiSize;i++) {
    for(j=0;j<uiSize;j++) {
        sum = 0;
        for(k=0;k<uiSize;k++)
            sum += TransposeBuffer[i][k] *
                DCTMatrix[k*uiDctOffset][j];
        pDst[i][j] = sum; }}}
```

For a directional transform or inverse transform operation, the transform engine 202 performs matrix multiplications on the input block 210 using two nxn directional transform matrices of the directional transform matrices 208 to produce the output block 212. For the matrix multiplications, the transform engine 202 may use the same matrix multiplication engine used to compute the DCT (IDCT) transforms. For a forward directional transform, the transform engine 102 may compute $P X Q^T$ where P is an nxn matrix for the column transform operation and Q is an nxn matrix for the row transform operation. And, for an inverse directional transform, the transform engine 102 may compute $Q X P^T$. Some directional transforms may be implemented such that P=Q.

In the transform architecture of FIG. 2, separate DCT matrices need not be stored for each of the different DCT block sizes supported by the video encoder and/or decoder. The contents of the largest transform matrix are instead reused with proper indexing according to the desired DCT block size. Thus, there is a significant savings in the memory needed to store DCT matrix entries.

This transform architecture provides fixed-point behavior for the DCT/IDCT such that the norm correction matrices used for quantization and inverse quantization in the prior art may be eliminated. Instead, the quantization step size or inverse quantization step size associated with a quantization parameter may be directly applied to the elements of a block being quantized or dequantized. Accordingly, the amount of data to be stored for quantization and inverse quantization can be reduced to one or more vectors of scalar quantization step sizes. The number of quantization and inverse quantization vectors, the number of elements in the vectors, and the values of the elements are set by the video coding standard. For example, there may be a quantization vector and an inverse quantization vector for each transform size or the same vector may be used for two or more transform sizes. Further, the number of quantization vectors and inverse quantization vectors may not be the same.

In some embodiments, a quantization vector or inverse quantization vector may have an element for each quantization parameter value. In some embodiments, the quantization and inverse quantization step sizes are chosen as defined in H.264/AVC and HEVC, i.e., such that the ratio between the successive step sizes is $$\sqrt[6]{2}.$$

Using this ratio, the step size doubles in size when the quantization parameter increases by six. Thus, any step size Qs can be derived from the first six step sizes for the first six quantization parameters (QPs) as follows $$Qs(QP) = Qs\left(\frac{QP}{6}\right) * 2^{floor\left(\frac{QP}{6}\right)}.$$

In such embodiments, a quantization vector or inverse quantization vector may have six elements for the first six step sizes and the remaining step sizes may be derived from these six elements. The quantization step size may have other nonlinear mappings to quantization parameters. For example, the quantization step size may be increased by a factor of M for every M step sizes. In such cases, a quantization or inverse quantization vector would have M elements for the first M step sizes. Or, there may be no structure in the mapping function between quantization parameters and step sizes, in which case a quantization vector or inverse quantization vector of size N is used, where N is the number of step sizes supported.

Using quantization and inverse quantization vectors can provide significant reduction in memory requirements when large transform block sizes are used. For example, in the TMuC-0.7.3, quantization and inverse quantization are performed using norm correction matrices for transforms of sizes 32x32 and 16x16. The matrices for quantization and inverse quantization in the TMuC-0.7.3 are of the following sizes: for quantization of a 32×32 block: UInt g_aiQuantCoef1024[6][1024], for inverse quantization of a 32×32 block: UInt g_aiDeQuantCoef1024[6][1024], for quantization of a 16×16 block: UInt g_aiQuantCoef256[6][256], and for inverse quantization of a 16×16 block: UInt g_aiDeQuantCoef256[6][256]. When the direct matrix multiplication of the transform architecture of FIG. 2 is used, theses norm correction matrices can be replaced with scalar quantization vectors as follows: for quantization of a 32×32 block: UInt g_aiQuantCoef1024_s[6], for inverse quantization of a 32×32 block: UInt g_aiDeQuantCoef1024_s[6], for quantization of a 16×16 block: UInt g_aiQuantCoef256_s[6], and for inverse quantization of a 16×16 block: UInt g_aiDeQuantCoef256_s[6]. Such replacement clearly provides a significant savings in the memory needed to store quantization information.

Figure 3:
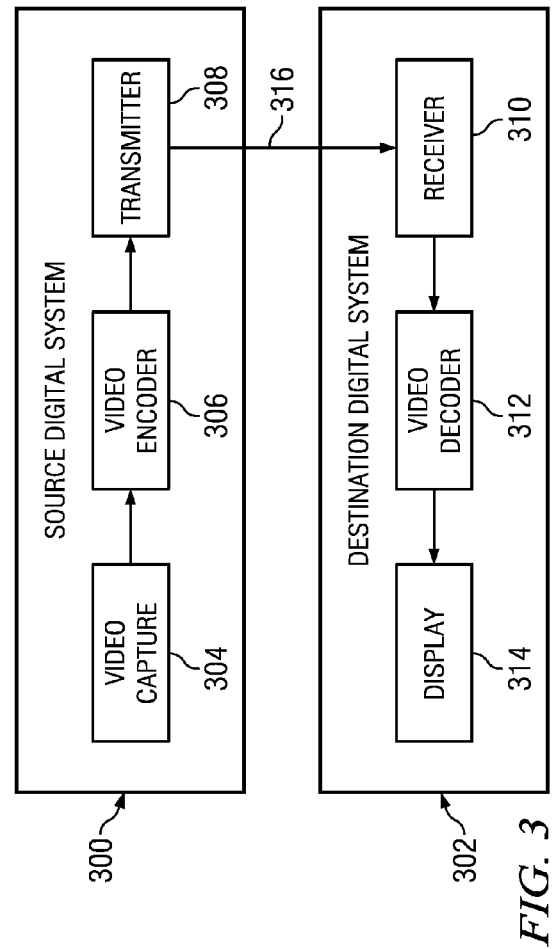
FIG. 3 shows a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of frames, divides the frames into largest coding units (LCUs), and encodes the video data in the LCUs. The video encoder component 306 may be configured to apply one or more techniques for transformation and quantization and inverse transformation and inverse quantization during the encoding process as described herein. Embodiments of the video encoder component 306 are described in more detail below in reference to FIGS. 4A and 4B.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to apply one or more techniques for inverse transformation and inverse quantization during the decoding process as described herein. Embodiments of the video decoder component 312 are described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4B:
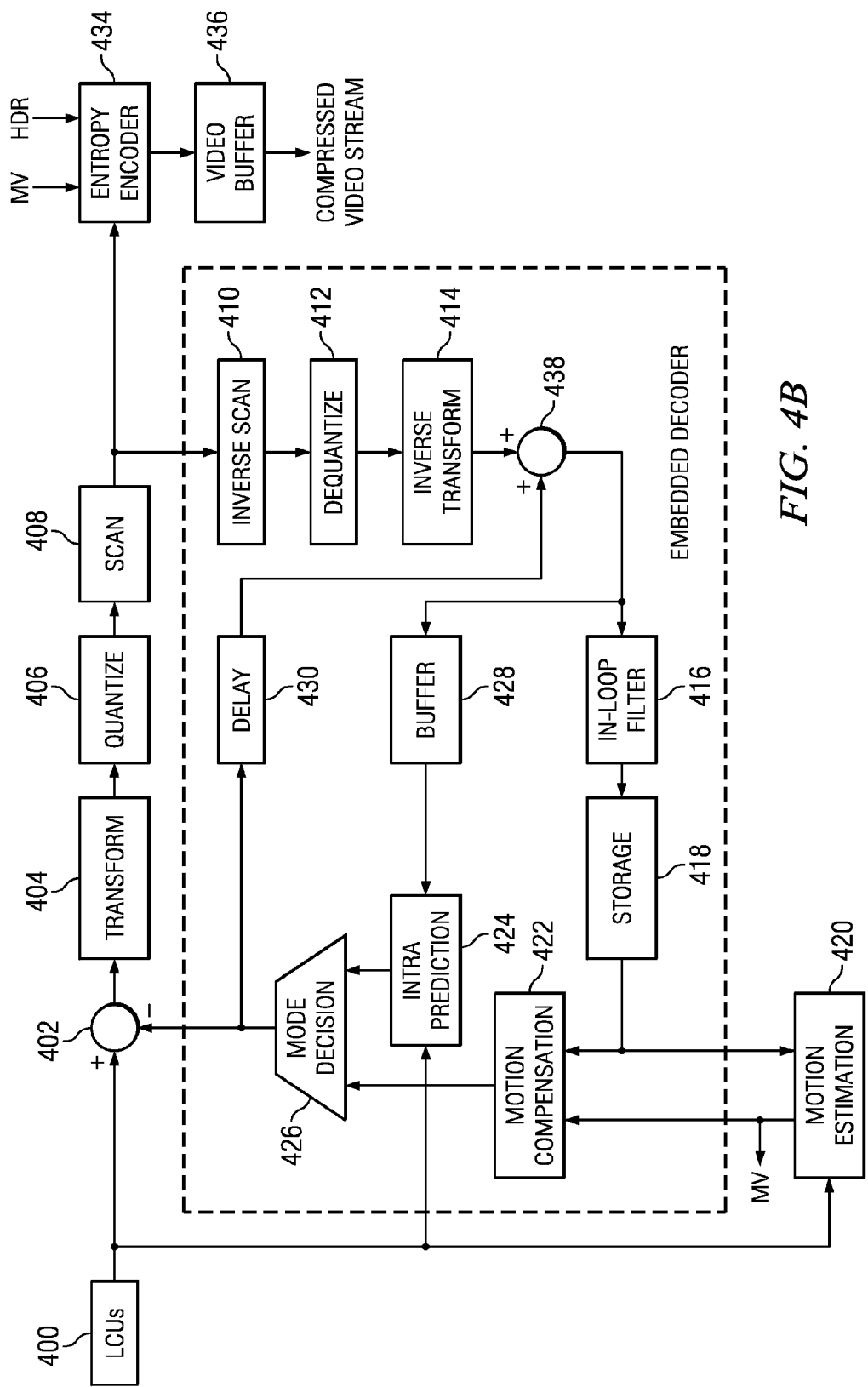

FIGS. 4A and 4B show block diagrams of a video encoder configured to use the transform architecture of FIG. 2. FIG. 4A shows a high level block diagram of the video encoder and FIG. 4B shows a block diagram of the LCU processing component 442 of the video encoder. For simplicity of explanation, the following description assumes that for purposes of quantization and inverse quantization, each DCT block size has an associated six element quantization vector and an associated six element inverse quantization vector. One of ordinary skill in the art will understand other embodiments in which the same vector is associated with two or more block sizes and/or the vectors differ in size and step size derivation.

As shown in FIG. 4A, a video encoder includes a coding control component 440, an LCU processing component 442, and a memory 446. The memory 446 may be internal memory, external memory, or a combination thereof. An input digital video sequence is provided to the coding control component 440. The coding control component 440 sequences the various operations of the video encoder. For example, the coding control component 440 performs any processing on the input video sequence that is to be done at the frame level, such as determining the coding type (I, P, or B) of a picture based on the high level coding structure, e.g., IPPP, IBBP, hierarchical-B, and dividing a frame into LCUs for further processing.

The coding control component 440 may determine the initial LCU CU structure for each CU and provides information regarding this initial LCU CU structure to the various components of the LCU processing component 442 as needed. The coding control component 440 may also determine the initial PU and TU structures of the CUs. The coding control component 440 also includes rate control functionality that determines the quantization parameter(s) for the CUs.

The LCU processing component 442 receives LCUs of the input video sequence from the coding control component 440 and encodes the LCUs to generate the compressed video stream. The CUs in the CU structure of an LCU may be processed by the LCU processing component 442 in a depth-first Z-scan order.

FIG. 4B shows the basic coding architecture of the LCU processing component 442. The LCUs 400 from the coding control unit 440 are provided as one input of a motion estimation component 420, as one input of an intra prediction component 424, and to a positive input of a combiner 402 (e.g., adder or subtractor or the like). Further, although not specifically shown, the prediction mode of each picture as selected by the coding control component 440 is provided to a mode selector component, and the entropy encoder 434.

The storage component 418 provides reference data to the motion estimation component 420 and to the motion compensation component 422. The reference data may include one or more previously encoded and decoded CUs, i.e., reconstructed CUs.

The motion estimation component 420 provides motion estimation information to the motion compensation component 422 and the entropy encoder 434. More specifically, the motion estimation component 420 performs tests on CUs in an LCU based on multiple temporal prediction modes and transform block sizes using reference data from storage 418 to choose the best motion vector(s)/prediction mode based on a coding cost. To perform the tests, the motion estimation component 420 may begin with the CU structure provided by the coding control component 440. The motion estimation component 420 may divide each CU indicated in the CU structure into prediction units according to the unit sizes of prediction modes and into transform units according to the transform block sizes and calculate the coding costs for each prediction mode and transform block size for each CU.

For coding efficiency, the motion estimation component 420 may also decide to alter the CU structure by further partitioning one or more of the CUs in the CU structure. That is, when choosing the best motion vectors/prediction modes, in addition to testing with the initial CU structure, the motion estimation component 420 may also choose to divide the larger CUs in the initial CU structure into smaller CUs (within the limits of the recursive quadtree structure), and calculate coding costs at lower levels in the coding hierarchy. If the motion estimation component 420 changes the initial CU structure, the modified CU structure is communicated to other components in the LCU processing component 442 that need the information.

The motion estimation component 420 provides the selected motion vector (MV) or vectors and the selected prediction mode for each inter predicted CU to the motion compensation component 423 and the selected motion vector (MV) to the entropy encoder 434. The motion compensation component 422 provides motion compensated inter prediction information to the mode decision component 426 that includes motion compensated inter predicted CUs, the selected temporal prediction modes for the inter predicted CUs, and corresponding transform block sizes. The coding costs of the inter predicted CUs are also provided to the mode decision component 426.

The intra prediction component 424 provides intra prediction information to the mode decision component 426 that includes intra predicted CUs and the corresponding spatial prediction modes. That is, the intra prediction component 424 performs spatial prediction in which tests based on multiple spatial prediction modes and transform unit sizes are performed on CUs in an LCU using previously encoded neighboring CUs of the picture from the buffer 428 to choose the best spatial prediction mode for generating an intra predicted CU based on a coding cost. To perform the tests, the intra prediction component 424 may begin with the CU structure provided by the coding control component 440. The intra prediction component 424 may divide each CU indicated in the CU structure into prediction units according to the unit sizes of the spatial prediction modes and into transform units according to the transform block sizes and calculate the coding costs for each prediction mode and transform block size for each CU.

For coding efficiency, the intra prediction component 424 may also decide to alter the CU structure by further partitioning one or more of the CUs in the CU structure. That is, when choosing the best prediction modes, in addition to testing with the initial CU structure, the intra prediction component 424 may also chose to divide the larger CUs in the initial CU structure into smaller CUs (within the limits of the recursive quadtree structure), and calculate coding costs at lower levels in the coding hierarchy. If the intra prediction component 424 changes the initial CU structure, the modified CU structure is communicated to other components in the LCU processing component 442 that need the information. Further, the coding costs of the intra predicted CUs and the associated transform block sizes are also provided to the mode decision component 426.

The mode decision component 426 selects between the motion-compensated inter predicted CUs from the motion compensation component 422 and the intra predicted CUs from the intra prediction component 424 based on the coding costs of the CUs and the picture prediction mode provided by the mode selector component. The output of the mode decision component 426, i.e., the predicted CU, is provided to a negative input of the combiner 402 and to a delay component 430. The associated transform block size is also provided to the transform component 404. The output of the delay component 430 is provided to another combiner (i.e., an adder) 438. The combiner 402 subtracts the predicted CU from the current CU to provide a residual CU to the transform component 404. The resulting residual CU is a set of pixel difference values that quantify differences between pixel values of the original CU and the predicted CU.

The transform component 404 performs unit transforms on the residual CUs to convert the residual pixel values to transform coefficients and provides the transform coefficients to a quantize component 406. More specifically, the transform component 404 includes the transform functionality of the transform architecture of FIG. 2. The transform component 404 receives the transform block sizes for the residual CUs and applies transforms of the specified sizes to the CUs to generate transform coefficients.

The quantize component 406 quantizes the transform coefficients based on quantization parameters (QPs) provided by the coding control component 440 and the transform sizes. For each block of transform coefficients, the quantize component 406 uses the quantization parameter to derive the quantization step size from a value in the quantization vector associated with the block size as previously described. The quantize component 406 then uses the derived quantization step size to quantize the transform coefficients.

The quantized transform coefficients are taken out of their scan ordering by a scan component 408 and arranged by significance, such as, for example, beginning with the more significant coefficients followed by the less significant. The ordered quantized transform coefficients for a CU provided via the scan component 408 along with header information for the CU are coded by the entropy encoder 434, which provides a compressed bit stream to a video buffer 436 for transmission or storage. The header information may include an indicator of the transform block size used for the CU and the quantization parameter for the CU. The entropy encoder 434 also codes the CU structure of each LCU as well as the PU and TU structures of each CU. The entropy coding performed by the entropy encoder 434 may be use any suitable entropy encoding technique, such as, for example, context adaptive variable length coding (CAVLC), context adaptive binary arithmetic coding (CABAC), run length coding, etc.

Inside the LCU processing component 442 is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients for a CU provided via the scan component 408 are returned to their original post-transform arrangement by an inverse scan component 410, the output of which is provided to a dequantize component 412, which outputs a reconstructed version of the transform result from the transform component 404. For each block of quantized transform coefficients, the dequantize component 412 uses the quantization parameter for the CU to derive the inverse quantization step size from a value in the inverse quantization vector associated with the block size as previously described. The dequantize component 412 then uses the derived inverse quantization step size to dequantize the quantized transform coefficients.

The dequantized transform coefficients are provided to the inverse transform component 414, which outputs estimated residual information which represents a reconstructed version of a residual CU. The inverse transform component 414 includes the inverse transform functionality of the transform architecture of FIG. 2. The inverse transform component 414 receives the transform block size used to generate the transform coefficients and applies inverse transform(s) of the specified size to the transform coefficients to reconstruct the residual values.

The reconstructed residual CU is provided to the combiner 438. The combiner 438 adds the delayed selected CU to the reconstructed residual CU to generate an unfiltered reconstructed CU, which becomes part of reconstructed picture information. The reconstructed picture information is provided via a buffer 428 to the intra prediction component 424 and to a filter component 416. The filter component 416 is an in-loop filter which filters the reconstructed frame information and provides filtered reconstructed CUs, i.e., reference data, to the storage component 418.

Figure 5:
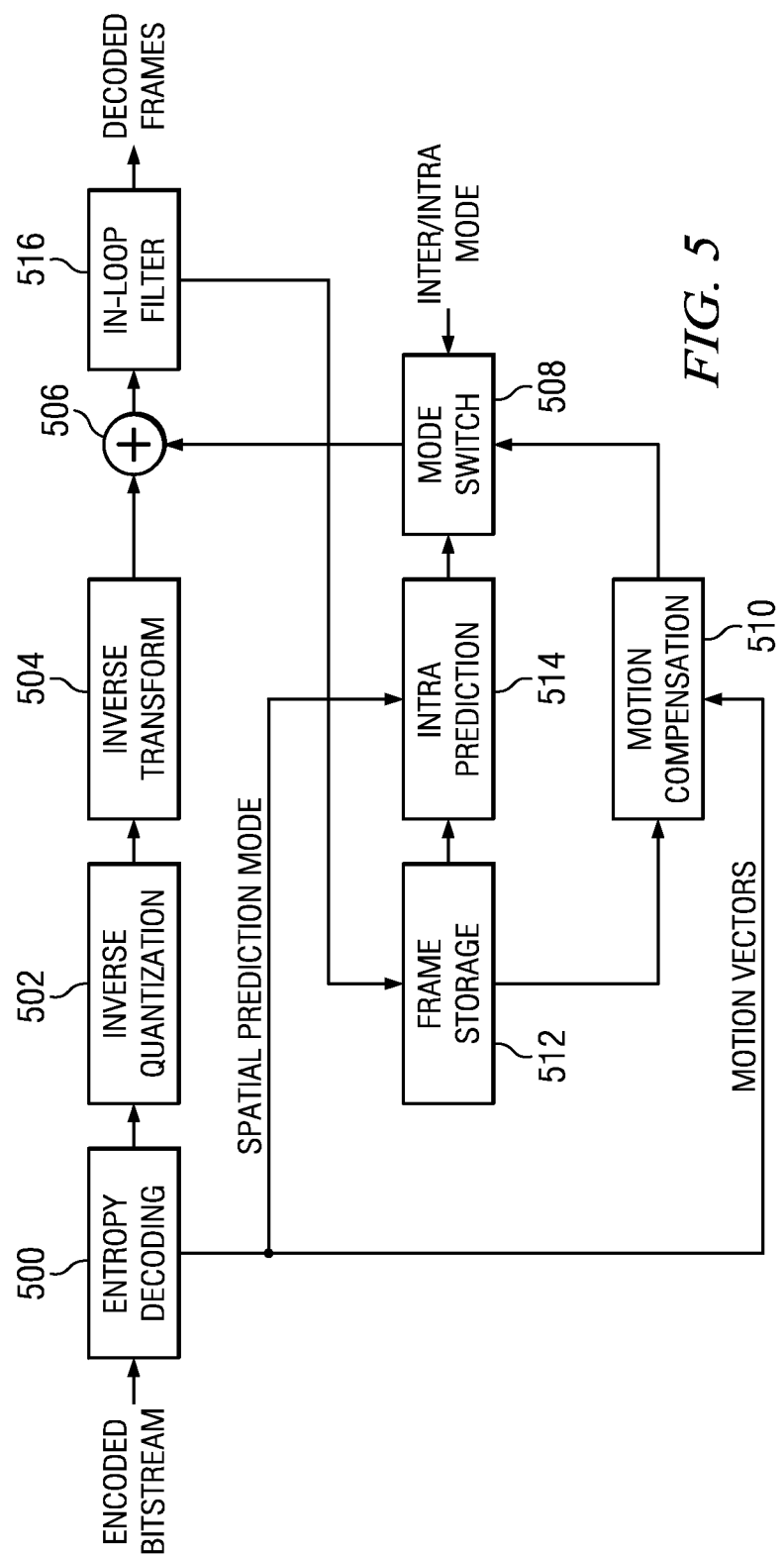
FIG. 5 shows a block diagram of a video decoder.

FIG. 5 shows a block diagram of a video decoder configured to use the inverse transform functionality of the transform architecture of FIG. 2. The video decoder operates to reverse the encoding operations, i.e., entropy coding, quantization, transformation, and prediction, performed by the video encoder of FIGS. 4A and 4B to regenerate the frames of the original video sequence. In view of the above description of a video encoder, one of ordinary skill in the art will understand the functionality of components of the video decoder without detailed explanation. For simplicity of explanation, the following description assumes that for purpose of inverse quantization, each DCT block size has an associated six element inverse quantization vector. One of ordinary skill in the art will understand other embodiments in which the same vector is associated with two or more block sizes and/or the vectors differ in size and step size derivation.

The entropy decoding component 500 receives an entropy encoded video bit stream and reverses the entropy encoding to recover the encoded CUs and header information such as the quantization parameters, the transform block sizes, and the encoded CU structures of the LCUs. The inverse quantization component 502 de-quantizes the quantized transform coefficients of the residual CUs. For each block of quantized transform coefficients, the inverse quantization component 502 uses the quantization parameter for the CU to derive the inverse quantization step size from a value in the inverse quantization vector associated with the block size as previously described. The inverse quantization component 502 then uses the derived inverse quantization step size to dequantize the quantized transform coefficients.

The inverse transform component 504 transforms the frequency domain data from the inverse quantization component 502 back to residual CUs. That is, the inverse transform component 504 applies an inverse unit transform, i.e., the inverse of the unit transform used for encoding, to the dequantized residual coefficients to produce the residual CUs. The inverse transform component 504 includes the inverse transform functionality of the transform architecture of FIG. 2.

A residual CU supplies one input of the addition component 506. The other input of the addition component 506 comes from the mode switch 508. When inter-prediction mode is signaled in the encoded video stream, the mode switch 508 selects a prediction unit from the motion compensation component 510 and when intra-prediction is signaled, the mode switch selects a prediction unit from the intra prediction component 514. The motion compensation component 510 receives reference data from storage 512 and applies the motion compensation computed by the encoder and transmitted in the encoded video bit stream to the reference data to generate a predicted CU. The intra-prediction component 514 receives previously decoded predicted CUs from the current picture and applies the intra-prediction computed by the encoder as signaled by a spatial prediction mode transmitted in the encoded video bit stream to the previously decoded predicted CUs to generate a predicted CU.

The addition component 506 generates a decoded CU, by adding the selected predicted CU and the residual CU. The output of the addition component 506 supplies the input of the in-loop filter component 516. The in-loop filter component 516 smoothes artifacts created by the block nature of the encoding process to improve the visual quality of the decoded frame. The output of the in-loop filter component 516 is the decoded frames of the video bit stream. Each decoded CU is stored in storage 512 to be used as reference data.

Figure 6:
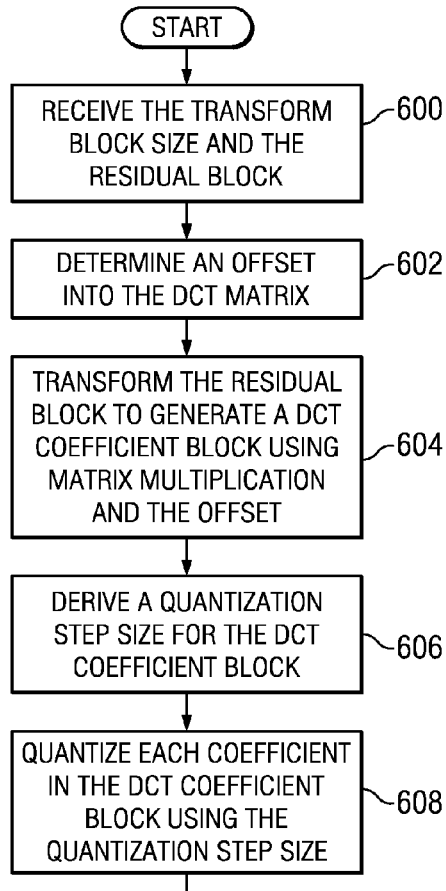
FIGS. 6-8 show flow diagrams of methods.

FIG. 6 is a flow diagram of a method for transformation using DCT with a single DCT matrix and quantization using a quantization vector in a video encoder. Initially, an indication of the transform block size and a residual block of the same size are received by a transform component in the video encoder 600. A residual block may be the residual CU or a subset of the residual CU. The transform block size is then used to determine an offset into the DCT matrix 602. The offset indicates the relative locations of rows and columns of a submatrix of the DCT matrix containing the transformation values for a DCT of the specified transform block size. The offset may be computed as previously described herein.

The residual block is then transformed to generate a DCT coefficient block using matrix multiplication and the offset 604. As was previously described, two full matrix multiplications may be performed to generate the DCT coefficient block, one using the DCT submatrix and one using the transpose of the DCT submatrix. The offset is used in each of the matrix multiplications to pick out the values of the DCT submatrix from the DCT matrix. As was previously described, a partial butterfly decomposition may be used to generate the DCT coefficient block in which the offset is used to pick out the values of the DCT submatrix from the DCT matrix.

A quantization step size for the DCT coefficient block is then derived based on the quantization parameter for the CU 606. A quantization vector corresponding to the transform block size and the quantization parameter are used for the derivation as previously described herein. Each coefficient in the DCT coefficient block is then quantized using the quantization step size 608. The resulting quantized DCT coefficient block may then be entropy coded and added to the output bitstream of the video encoder.

Figure 7:
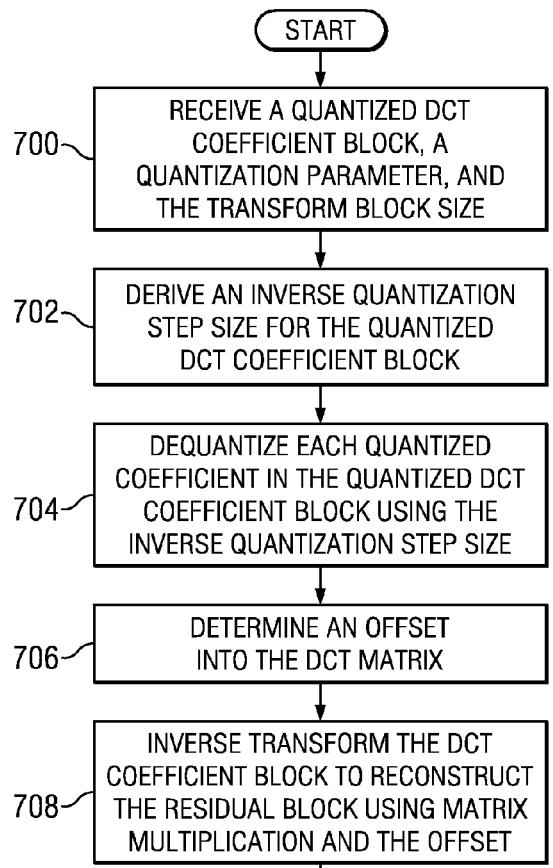

FIG. 7 is a flow diagram of a method for inverse transformation using IDCT with a single DCT matrix and inverse quantization using an inverse quantization vector that may be used in a video encoder or a video decoder. Initially, an indication of the transform block size, a quantized DCT coefficient block of the same size, and a quantization parameter for the CU corresponding to the quantized DCT coefficient block are received 700. A quantized DCT coefficient block may be quantized coefficients for an entire CU or for a subset of the CU. An inverse quantization step size for the quantized DCT coefficient block is then derived based on the quantization parameter for the CU 702. An inverse quantization vector corresponding to the transform block size and the quantization parameter are used for the derivation as previously described herein. Each quantized coefficient in the quantized DCT coefficient block is then dequantized using the inverse quantization step size 704.

The transform block size is then used to determine an offset into the DCT matrix 706. The offset indicates the relative locations of rows and columns of a submatrix of the DCT matrix containing the transformation values for an IDCT of the specified transform block size. The offset may be computed as previously described herein.

The dequantized DCT coefficient block is then inverse transformed to reconstruct the residual block using matrix multiplication and the offset 708. As was previously described, two full matrix multiplications may be performed to generate the residual block, one using the DCT submatrix and one using the transpose of the DCT submatrix. The offset is used in each of the matrix multiplications to pick out the appropriate values of the DCT submatrix from the DCT matrix. As was previously described, a partial butterfly decomposition may be used to generate the residual block in which the offset is used to pick out the values of the IDCT submatrix from the DCT matrix. The residual block may then be further processed by the video encoder or the video decoder.

Some fast DCT algorithms implement DCT using a butterfly decomposition approach in multiple stages. For example, the DCT and IDCT implementations in TMuC-0.7.3 use several stages of butterfly decomposition. The multiple stages introduce serial dependency and cascaded multipliers. Also, after each butterfly stage involving multiplication, a rounding/truncation operation is carried out to prevent bit-width increase of data resulting from the cascaded multiplication. These factors lead to increased delay in a hardware implementation and limit the maximum frequency at which a DCT or IDCT can be executed. These issues become more acute for large transform block sizes as the number of stages increases with block size.

Figure 8:
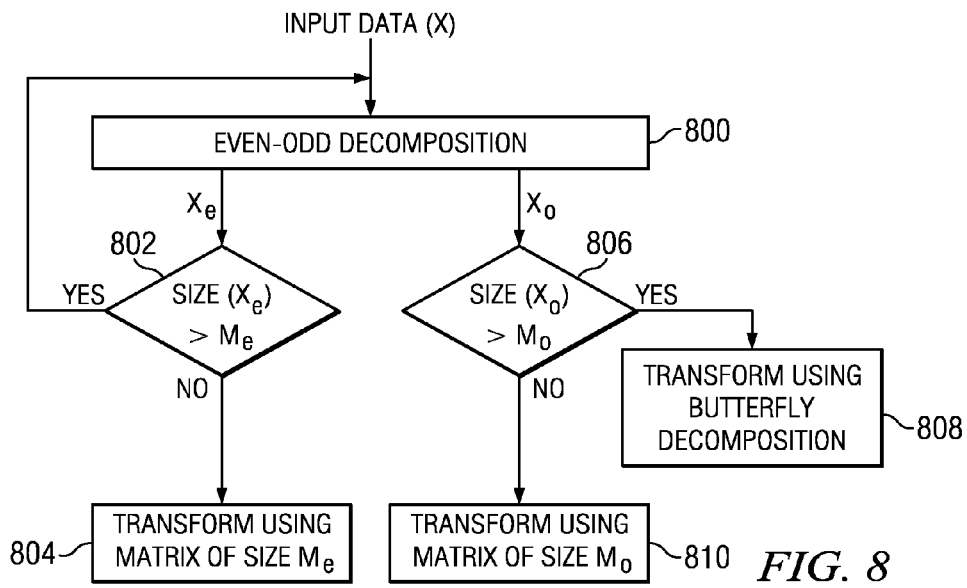

FIG. 8 is a flow diagram of a DCT method that combines matrix multiplication with a decomposition approach. This method reduces the number of decomposition stages. The method may be used to decompose a larger input block size into smaller block sizes that are then transformed using smaller DCT matrices and matrix multiplication and. One of ordinary skill in the art, having benefit of the description of FIG. 8, will understand the corresponding IDCT method without need for additional description.

FIG. 8 is explained using a 1D transform. Extension to a 2D transform will be understood by one of ordinary skill in the art. Initially, the input residual vector X is decomposed using even-odd decomposition 800. An example of even-odd decomposition for an 8-point DCT/IDCT is shown in FIG. 2B. The even-odd decomposition results in two vectors, a vector $X_e$ containing the even elements of the input vector X and a vector $X_o$ containing the odd elements. Each vector will be half the size of the input vector X. Each of these vectors is then processed separately.

For the even vector $X_e$, the size of the vector is compared to a threshold size $M_e$ 802. The threshold $M_e$ specifies the maximum size below which the even vector will not be further decomposed. This maximum size is the maximum transform size for which direct matrix multiplication will be used to compute the DCT. The value of $M_e$ may be empirically predetermined, determined dynamically, and/or user specified. If the even vector $X_e$ exceeds this threshold, then the vector may be repeatedly decomposed into two smaller vectors using even-odd decomposition until the desired size is attained. The resulting vector is then transformed using direct matrix multiplication with a DCT matrix of size $M_e$ 804. The transform may be applied according to the transform architecture of FIG. 2 in which the transform block size will be $M_e$.

For the odd vector $X_0$, the size of the matrix is compared to a threshold size $M_0$ 806. The threshold $M_o$ specifies the maximum size below which matrix multiplication will not be used for transform of $X_0$. $M_o$ is maximum size for which direct matrix multiplication will be used to compute the DCT. The value of $M_o$ may be empirically predetermined, determined dynamically, and/or user specified. If the odd vector $X_0$ exceeds this threshold, then the DCT is applied using butterfly decomposition instead of matrix multiplication.

Figure 9:
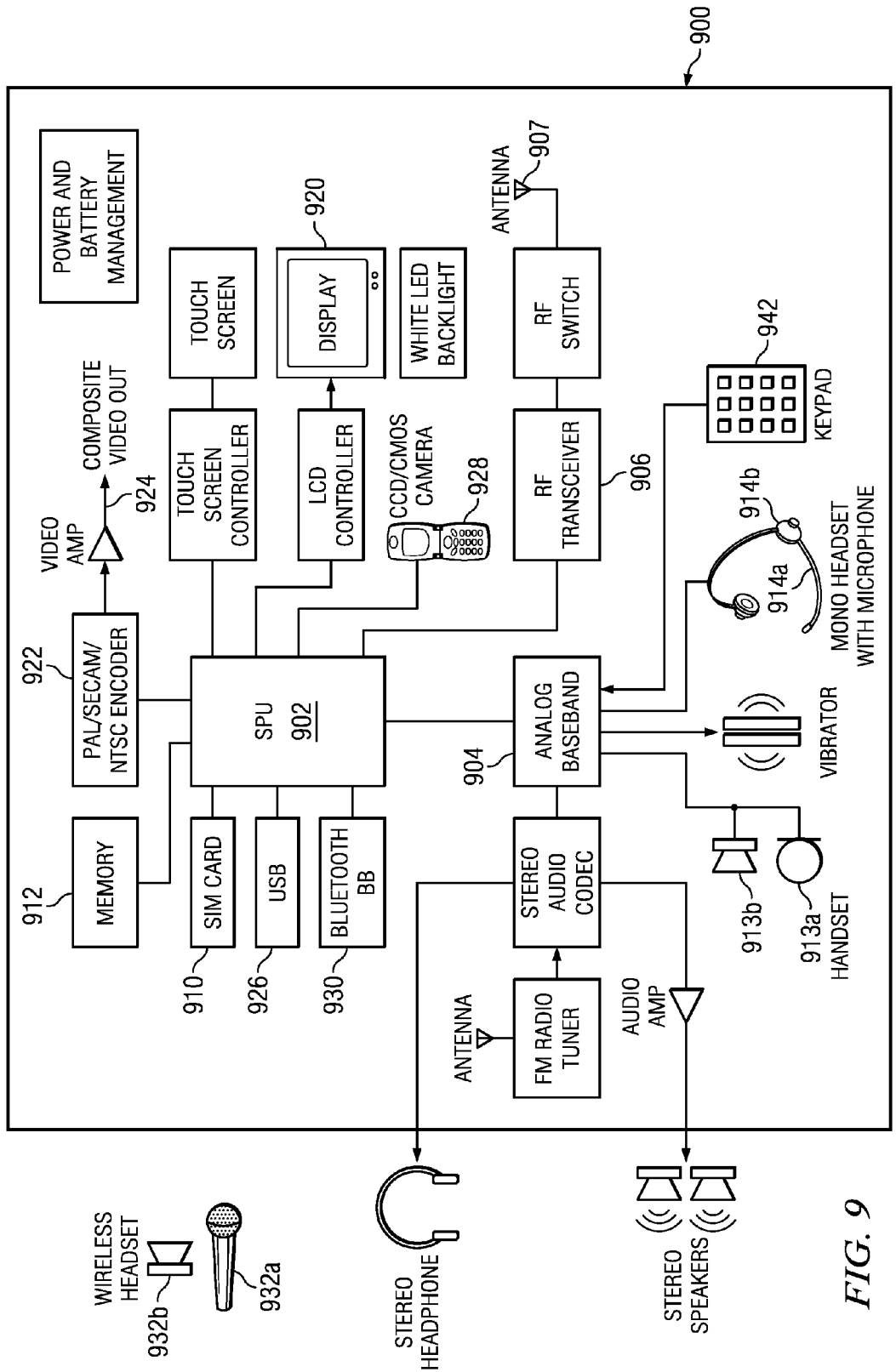
FIG. 9 shows a block diagram of an illustrative digital system.

Embodiments of the methods, encoders, and decoders described herein may be implemented for virtually any type of digital system (e.g., a desk top computer, a laptop computer, a handheld device such as a mobile (i.e., cellular) phone, a personal digital assistant, a digital camera, etc.). FIG. 9 is a block diagram of a digital system (e.g., a mobile cellular telephone) 900 that may be configured to use techniques described herein.

As shown in FIG. 9, the signal processing unit (SPU) 902 includes a digital signal processing system (DSP) that includes embedded memory and security features. The analog baseband unit 904 receives a voice data stream from handset microphone 913a and sends a voice data stream to the handset mono speaker 913b. The analog baseband unit 904 also receives a voice data stream from the microphone 914a and sends a voice data stream to the mono headset 914b. The analog baseband unit 904 and the SPU 902 may be separate ICs. In many embodiments, the analog baseband unit 904 does not embed a programmable processor core, but performs processing based on configuration of audio paths, filters, gains, etc being setup by software running on the SPU 902.

The display 920 may display pictures and video sequences received from a local camera 928, or from other sources such as the USB 926 or the memory 912. The SPU 902 may also send a video sequence to the display 920 that is received from various sources such as the cellular network via the RF transceiver 906 or the Bluetooth interface 930. The SPU 902 may also send a video sequence to an external video display unit via the encoder unit 922 over a composite output terminal 924. The encoder unit 922 may provide encoding according to PAL/SECAM/NTSC video standards.

The SPU 902 includes functionality to perform the computational operations required for video encoding and decoding. In one or more embodiments, the SPU 902 is configured to perform computational operations for applying one or more techniques for transformation and quantization during the encoding process as described herein. Software instructions implementing all or part of the techniques may be stored in the memory 912 and executed by the SPU 902, for example, as part of encoding video sequences captured by the local camera 928. The SPU 902 is also configured to perform computational operations for applying one or more techniques for inverse transformation and inverse quantization as described herein as part of decoding a received coded video sequence or decoding a coded video sequence stored in the memory 912. Software instructions implementing all or part of the techniques may be stored in the memory 912 and executed by the SPU 902.

Other Embodiments

While the invention has been described with respect to a limited number of embodiments, those skilled in the art, having benefit of this disclosure, will appreciate that other embodiments can be devised which do not depart from the scope of the invention as disclosed herein. For example, embodiments have been described herein in reference to HEVC. One of ordinary skill in the art, having benefit of this disclosure, will understand other embodiments in which the video encoding/decoding may include more or fewer transform block sizes and/or differing transform block sizes such as transform block sizes larger than 64×64.

In some embodiments, norm correction matrices may be used for quantization and inverse quantization of smaller transform blocks, e.g., 4×4 and 8×8, and one or more quantization and inverse quantization vectors may be used for larger transform blocks, e.g., 16×16, 32×32, and 64×64.

In some embodiments, non-square n×m transforms where n≠m, e.g., 8×4, 16×8, 16×32, may also be used. In such embodiments, the DCT matrix also includes the elements for such transforms. Further, two offsets, an offset for a row transform submatrix and an offset for a column transform submatrix, are computed and used to extract the elements for the specific non-square transform size. A non-square n×m transform may be computed, for example, as $D_n \times D^T_m$ where $D_n$ is an n×n row transform submatrix and $D_m$ is an m×m column transform submatrix.

In some embodiments, the size of the single DCT matrix is the size of the largest DCT transform for which the matrix multiplication using one or more offsets is to be performed. In other words, the DCT matrix may be smaller than the largest DCT transform supported by the video encoder and decoder and other techniques may be used for the larger DCT transforms.

In some embodiments, the matrix multiplication using one or more offsets may be used for larger transforms, e.g., 16×16, 32×32, 64×64, and separate DCT matrices may be used for the smaller transforms.

Embodiments have been described herein in reference to a single DCT matrix. As is well known in the art, an IDCT matrix is the transpose of a DCT matrix. In many video encoding standards, IDCT matrices are defined rather than DCT matrices. Accordingly, embodiments that use a single IDCT matrix that is the transpose of the single DCT matrix will be understood by one of ordinary skill in the art.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of encoding a video stream, comprising:
providing a transform matrix having a size M×M; providing a residual block having a size P×P; computing an offset into the transform matrix based on the size of the residual block when P is less than M; transforming the residual block to generate a DCT coefficient block using elements of the transform matrix selected by the offset; providing a quantization step size for the DCT coefficient block; and quantizing each non-zero coefficient in the DCT coefficient block using the quantization step size.

2. The method of claim 1, transforming the residual block to generate
the DCT coefficient block using elements of the transform matrix selected by the offset
comprising:
selecting the $n^{th}$ elements of the $n^{th}$ rows of the transform matrix.

3. The method of claim 1, transforming the residual block to generate
the DCT coefficient block using elements of the transform matrix selected by the offset
comprising:
selecting the $n^{th}$ elements of the $n^{th}$ rows of the transform matrix, including a
zeroth element in a zeroth row, to perform the transforming.

4. The method of claim 1, the elements of the transform matrix limited to
a range represented by a signed seven bit value.

5. The method of claim 1, comprising:
deriving the quantization step size for the DCT coefficient block based on at least
one of a quantization vector and a quantization parameter.

6. The method of claim 1, comprising:
deriving the quantization step size for the DCT coefficient block; and
quantizing each non-zero coefficient in the DCT coefficient block using the quantization
step size; and
entropy coding data representing the quantized DCT coefficients.

7. The method of claim 1, comprising:
capturing an image using a camera;
partially encoding the image to yield an 8×8 residual block;
quantizing the DCT coefficient block;
entropy coding the quantized DCT coefficient block; and
transmitting encoded data using an RF transmitter.

8. The method of claim 1, comprising:
providing a 32×32 transform matrix; and
providing a 16×16 residual block.

9. The method of claim 1, comprising:
providing a 32×32 transform matrix; and
providing an 8×8 residual block.

10. A method of encoding data comprising:
capturing an image;
partially encoding the image to yield an 8×8 residual block;

providing a 32×32 transform matrix;
transforming the residual block using a matrix comprising values M[l,j]
from the transform matrix where i and j are 0, 4, 8, 12, 16, 20, 24, and 28, to yield a DCT coefficient block;
providing a quantization step size for the DCT coefficient block;
quantizing each non-zero coefficient in the DCT coefficient block using the quantization step size;
entropy coding the quantized DCT coefficient block; and
transmitting the entropy encoded quantized DCT coefficient block.

11. A method of decoding a video stream, comprising:
providing an inverse transform matrix having a size M×M;
providing an encoded quantized DCT coefficient block having a size P×P;
inverse quantizing at least one non-zero coefficient in the quantized DCT coefficient
block to provide a DCT coefficient block;
computing an offset into the inverse transform matrix based on the size of the DCT
coefficient block when P is less than M; and
transforming the DCT coefficient block to generate a residual block using
elements of the inverse transform matrix selected by the offset.

12. The method of claim 11, transforming the DCT coefficient block to
generate a residual block using elements of the inverse transform matrix selected by the offset comprising:
selecting the nth elements of the nth rows of the inverse transform matrix.

13. The method of claim 11, transforming the DCT coefficient block to
generate a residual block using elements of the inverse transform matrix selected by the offset comprising:
selecting the nth elements of the n'h rows of the inverse transform matrix, including the zeroth element in the zeroth row, to perform the transforming.

14. The method of claim 11, the elements of the inverse transform matrix limited to a range represented by a signed seven bit value.

15. The method of claim 11, comprising:
entropy decoding a bitstream to provide a decoded bitstream including an encoded quantized DCT coefficient block;
inverse quantizing at least one coefficient in the quantized DCT coefficient block to provide the DCT coefficient block.

16. The method of claim 11, comprising:
receiving an encoded bitstream;
entropy decoding the encoded bitstream to provide a quantized DCT coefficient block having a size P×P;
inverse quantization decoding at least one coefficient of the quantized DCT coefficient block to provide a DCT coefficient block;
transforming the DCT coefficient block to generate a residual block using elements of the inverse transform matrix selected by the offset;
using the residual block to generate a reconstructed image; and
displaying the reconstructed image.

17. The method of claim 11, comprising:
providing a 32×32 inverse transform matrix; and
providing a 16×16 DCT coefficient block.

18. The method of claim 11, comprising:
providing a 32×32 inverse transform matrix; and
providing an 8×8 DCT coefficient block residual.

* * * * *